Nov. 17, 1964 W. A. LLOYD 3,157,808
HIGH VACUUM APPARATUS
Filed Dec. 30, 1960
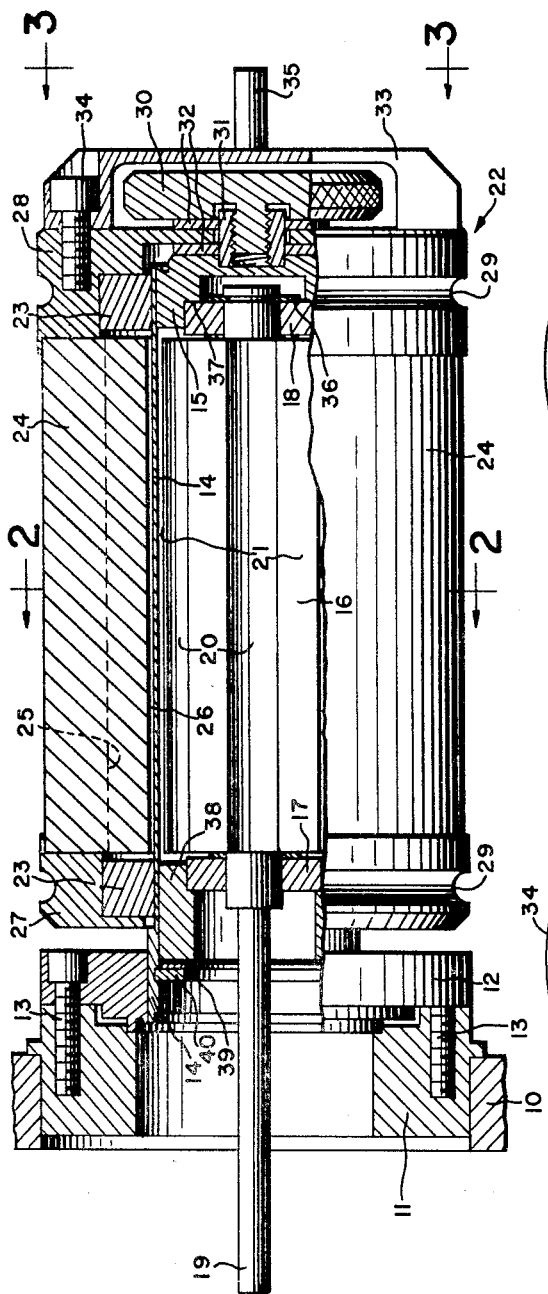
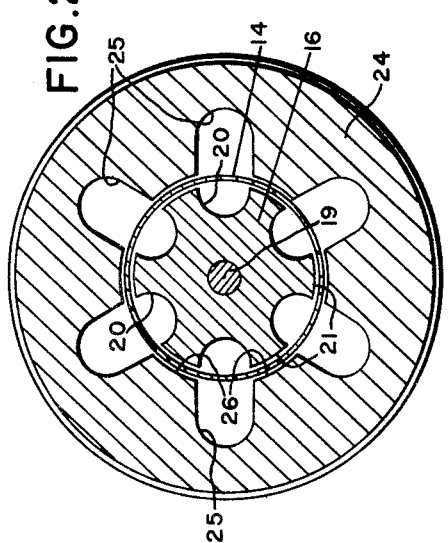
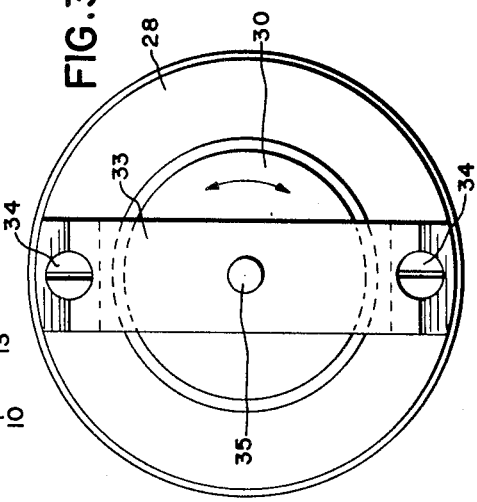
INVENTOR.
WILLIAM A. LLOYD
BY
Wm J. Nolan
ATTORNEY United States Patent Office 3,157,808
Patented Nov. 17, 1964

3,157,808
HIGH VACUUM APPARATUS
William A. Lloyd, Sunnyvale, Calif., assignor to Varian Associates, Palo Alto, Calif., a corporation of California
Filed Dec. 30, 1960, Ser. No. 79,700
2 Claims. (Cl. 310—104)

This invention relates to vacuum apparatus and more particularly to apparatus for transmitting motion through a vacuum wall.

Many of the testing procedures and production techniques in use today require performance under high vacuum conditions and it is necessary in many cases to impart motion to components inside the vacuum system. Since the prime mover is normally outside the vacuum system, there must be some means for transmitting motion through the vacuum wall. In the past, this motion has been transmitted by shafts passing through various well known vacuum sealing means such as O rings, rubber seals, bellows, etc. Certain disadvantages and difficulties result from using vacuum seals of the above types; for example, friction between the motion transmitting shaft and the vacuum seal prevents the transmission of high speed motion and also necessitates frequent replacement of worn vacuum seals. Also, high temperature baking of components within the system is difficult since the vacuum seals must be made of materials such as plastics and rubber which will not withstand the high temperatures required. Contamination of the vacuum system by the lubrication necessary with the above seals is still another problem associated with their use. In addition to contaminating the vacuum system, these lubricants serve as a source of organic vapor which provides an additional gas load for the vacuum pump thereby reducing its effectiveness.

It is, therefore, the object of the present invention to provide improved apparatus for transmitting motion through a vacuum wall which is bakeable at high temperatures, free from contaminating lubricants, capable of transmitting at high speeds, and relatively free from friction failure.

One feature of the present invention is the use of a permanent magnet driving assembly and magnetic rotor assembly to transmit motion through the continuous vacuum wall of a high vacuum system.

Still another feature of the present invention is an easily removable permanent magnet driving assembly and the exclusive use of bakeable materials in the driven assembly of motion transmitting apparatus of the above type thereby rendering it bakeable at high temperatures, for example, 400° C.

These and other features and objects of the invention will be set forth with more particularity in the following detailed description when considered with the accompanying drawings, in which:

FIG. 1 is the drawing of the motion transmitting apparatus which comprises the present invention.

FIG. 2 is a cross section of FIG. 1 taken on line 2—2 showing the relationship between the armature and magnet in accordance with this invention.

FIG. 3 is an end view of FIG. 1 taken at line 3—3.

Referring now to the drawings, the motion transmitting apparatus made in accordance with this invention comprises a main vacuum wall 10 of a vacuum chamber and embedded annular flange 11 which supports the annular mating flange 12 along its circumference by a series of bolts 13. The mating flange 12 supports one end of a metallic cylindrical casing 14 whose other end is sealed by a cup-shaped closure 15 so that the vacuum wall 11, the cylindrical metal casing 14, and associated cup-shaped closure 15 from a continuous metal enclosure which is a part of the entire vacuum system. Within the housing formed by the cylindrical casing 14 and the cup-shaped closure 15 a cylindrical iron rotor 16 and its straddling inner steel bearing 17 and outer steel bearing 18 are rotatively mounted on the shaft 19 which extends through an opening in the vacuum wall 10. The iron rotor 16, as more clearly shown in FIG. 2, has the form of a cylinder with a plurality of uniform spaced transverse grooves 20 on its outer surface forming a plurality of radially extending poles 21. The cup-shaped driving assembly 22 including supporting steel bearings 23 is rotatably mounted on the metal casing 14. The driving assembly 22 includes a hollow cylindrical permanent magnet 24 having, as shown more clearly in FIG. 2, a plurality of uniformly spaced transverse grooves 25 on its inner surface forming the radially extending pole pieces 26. The cylindrical magnet 24 is supported at one end by the annular aluminum end piece 27 and at its other end by the cup-shaped aluminum end piece 28, each having a circumferential groove 29 which may be used to provide a belt drive to the driving assembly 22 from an external prime mover. The lock bolt 30 engages the threaded interior of a ring 31 which has one end embedded in the center of closure 15 and one end extending through a central aperture in the cup-shaped end piece 28. The threaded ring 31 passes through a pair of annular washers 32 which engage opposite sides of the end piece 28 whereby tightening of the lock bolt 30 will exert a pressure on the end piece 28 through the annular washers 32 to thereby prevent rotation of the entire driving assembly 22. Spanning the lock bolt 30 is the arched bar 33 which is attached to the end piece 28 by a pair of machine screws 34. The arched bar 33 supports the external shaft 35 which may be used in addition to or in lieu of the belt grooves 29 to transmit motion to the driving assembly 22 from any available prime mover.

In assembling the driven structure within the metal casing 14, the rotor 16 and associated steel bearings 17, 18 are mounted on the shaft 19 and maintained in place by the retaining ring 36. This entire assembly is then slid into the open end of the casing 14 until the outer bearing 18 engages the shoulder 37 of the cup-shaped closure 15. The annular bearing collar 38 and ring shim 39, whose purpose will be explained below, are then pushed into engagement with the inner bearing 17 and this entire assembly is held in place by the retaining ring 40. It is necessary to allow a certain amount of relative lateral movement between the iron rotor 16 and the steel casing 14 where the device is to be baked at relatively high temperatures because these parts have different coefficients of expansion. The tooling of all parts within the metal casing 14 accurately enough to obtain the exact amount of relative movement desired would be a very costly procedure. Therefore, the parts are tooled with a rougher tolerance in order to provide a larger lateral movement than is required and the shim 39 is then chosen with a width such as to provide the desired amount of relative lateral movement between the casing 14 and the associated rotor assembly. The cup-shaped driving assembly is then mounted by sliding it over the end of metal casing 14 and is attached with the lock bolt 30.

In operation of the device the magnetic lines produced by the magnet 24 are coupled into the iron rotor 16 producing a magnetic force which causes the poles 26 and the poles 21 to line up collaterally as shown in FIG. 2. A rotary movement of the magnet 24 will then induce a magnetic force tending to hold the poles 21 and 26 in collateral alignment. This magnetic force will cause the rotor 16 and its associated shaft 19 to rotate at the same speed and in the same direction as that of the magnet 24 thus transmitting the motion inside the vacuum chamber.

The lock bolt 30 may be tightened to prevent further rotation whenever it is desired to maintain the rotor 16 in a particular position.

It will be seen, therefore, that the apparatus constituting the present invention will transmit motion through a vacuum wall without the use of previously required vacuum seals thereby providing an all metal, exceptionally clean vacuum system which is relatively free from friction wear and can be baked at high temperatures.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for transmitting motion into a high vacuum system comprising a cylindrical housing, said cylindrical housing having a closed end and an open end adapted to communicate with an opening in the vacuum wall of a high vacuum chamber, supporting means adapted to support said cylindrical housing outside the vacuum chamber by attachment to the vacuum wall, said cylindrical housing adapted to form with the vacuum wall a continuous vacuum tight enclosure upon attachment thereto, a cup-shaped driving means including a permanent magnet, the external surface of said cup-shaped driving means forming a circumferential groove adapted to accommodate a belt drive for supplying power thereto, a driven means including a magnetic rotor adapted to transmit motion into the vacuum chamber in response to movement of said cup-shaped driving means, said driven means positioned within said cylindrical housing, said cup-shaped driving means rotatably mounted on said cylindrical housing and adapted for easy removal so as to allow high temperature baking of said cylindrical housing and said driven means, and adjustable mechanical locking means for preventing rotary movement of said cup-shaped driving means.

2. Apparatus according to claim 1 including means for restricting relative lateral movement between said cylindrical housing and said magnetic rotor, and said means for restricting lateral movement including shim means for precisely determining the amount of said relative lateral movement.

References Cited in the file of this patent

UNITED STATES PATENTS

| | | |
|---|---|---|
| 2,613,176 | Goldsbarry | Oct. 7, 1952 |
| 2,898,485 | Richter | Aug. 4, 1959 |
| 3,050,646 | Eddy | Aug. 21, 1962 |
| 3,052,805 | Hudson | Sept. 4, 1962 |

UNITED STATES PATENT OFFICE
CERTIFICATE OF CORRECTION

Patent No. 3,157,808                        November 17, 1964

William A. Lloyd

It is hereby certified that error appears in the above numbered patent requiring correction and that the said Letters Patent should read as corrected below.

Column 1, line 26, for "worm" read -- worn --; line 72, for "from" read -- form --; column 2, line 8, for "uniform" read -- uniformly --.

Signed and sealed this 29th day of June 1965.

(SEAL)
Attest:

ERNEST W. SWIDER                        EDWARD J. BRENNER
Attesting Officer                          Commissioner of Patents